May 14, 1946.  J. C. BARNABY ET AL  2,400,219
DUAL FUEL ENGINE
Filed Dec. 15, 1944  4 Sheets-Sheet 1

James C. Barnaby
William L. Russell
INVENTOR

BY Robt Meyer
ATTORNEY

Patented May 14, 1946

2,400,219

UNITED STATES PATENT OFFICE 2,400,219

DUAL FUEL ENGINE

James C. Barnaby, Short Hills, and William L. Russell, East Orange, N. J., assignors to Worthington Pump and Machinery Corporation, Harrison, N. J., a corporation of Delaware Application December 15, 1944, Serial No. 568,346

18 Claims. (Cl. 123—1)

This invention relates to internal combustion engines, and more particularly to a dual fuel engine.

Many industrial plant processes generate gases which provide an economical source of gas fuel suitable for internal combustion engines, such as, for example, in sewerage plants wherein engines are operated on gas resulting from the digestion of sewage. In many instances, however, the available gas is insufficient to meet the needs of the engine or engines operated on such gas. Then, too, there are many locations where natural gas is available for engine fuel purposes, but in either a limited or intermittent amount. Under conditions wherein the available gas supply is insufficient or intermittent or both, it is desirable to make up the deficiency in the gas fuel available by fuel oil. It is important, therefore, that a dual fuel engine should, when operating under the foregoing conditions, automatically use all the gas fuel available and make up the deficiency with oil fuel without requiring personal attention or manual adjustment.

Accordingly, an object of the present invention is to provide a dual fuel engine which will operate on either oil or gas as a fuel or any combination of the two, in which novel means are incorporated for automatically controlling the amount of oil fuel used by the engine as a function of the amount of available gas fuel.

Another object is to provide a dual fuel engine in which novel governor actuated means are provided for automatically controlling the admission of one fuel in amounts only sufficient to supplement deficiencies in the other fuel.

Another object is to provide a dual fuel engine which will operate on either oil or gas as a fuel or any combination of the two, wherein the relative proportions of oil fuel and gas fuel may be controlled either manually or automatically, depending upon the amount of available gas fuel.

A further object is to provide a dual fuel engine which will operate on either oil or gas as a fuel or any combination of the two, in which means are provided for automatically regulating the delivery of oil fuel to the engine in amounts such as to supplement deficiencies in gas fuel and in which means are provided for maintaining a pilot injection of oil fuel regardless of the amount of gas fuel delivered to the engine.

By dual fuel engine is meant one which has sufficient compression to operate as a fuel injection, compression ignition engine on oil fuel (i. e., what is commonly called a direct injection Diesel engine) or as a high compression gas engine with the ignition effected by a small injection of oil fuel commonly known as pilot injection or by electric ignition. The following description assumes the engine to operate with pilot fuel oil injection for ignition when operating with gas fuel; the same pump and nozzle being used for the pilot fuel oil injection when operating with gas fuel as is used for the main fuel injection when operating on all or practically all on oil fuel. It is also assumed that for operation on gas fuel, a single mixing valve is employed for controlling both the gas and the air.

With these and other objects in view, as may appear from the accompanying specification, the invention consists of various features of construction and combination of parts, which will be first described in connection with the accompanying drawings, showing a dual fuel engine of a preferred form embodying the invention, and the features forming the invention will be specifically pointed out in the claims.

In the drawings—

Figure 6 is a cross sectional view of the engine.

Referring more particularly to the drawings, Figure 6 illustrates an engine frame 1 which carries a cylinder 2 having a piston 3 slidably mounted therein. A connecting rod 4 connects the piston 3 with a crank shaft 5 in the usual manner. A fuel injection nozzle 6 is incorporated in the cylinder head 7, which nozzle communicates with the combustion chamber 8 in the cylinder 2. While Figure 6 illustrates a single cylinder, the engine may incorporate any number of cylinders, depending upon the specific work to be performed by the engine.

Figures 4, 5:
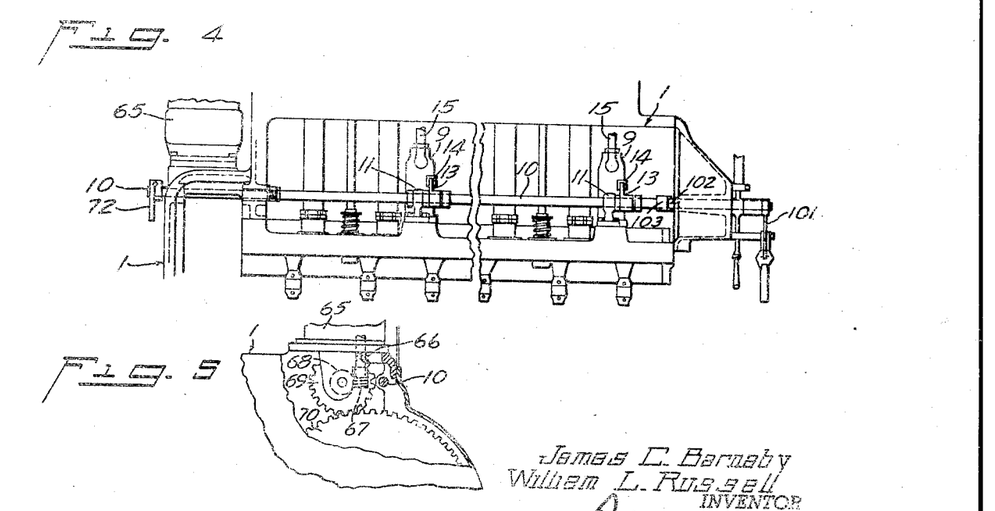
Figure 4 is a fragmentary elevational view illustrating a fuel pump control shaft and fuel pumps operatively connected therewith.
Figure 5 is a sectional detail view of a governor drive.

Figure 4 illustrates conventional fuel pumps 9 which are mounted on the engine frame 1. A fuel pump control shaft 10 is rotatably mounted in bearings 11, and the control rods 12 associated with the respective fuel pumps 9 (see Figure 6) are operatively connected with the shaft 10 through the medium of levers 13 which are fixed to the shaft 10 and links 14 which are pivotally connected with both the levers and the control rods. In the arrangement shown in Figure 4, the shaft 10 parallels the longitudinal axis of the engine, with the control rods 12 arranged at right angles to that axis. Each fuel pump 9 is provided with a fuel injection pipe 15, as in Figure 7, which connects with one of the fuel injection nozzles 6.

Figure 7:
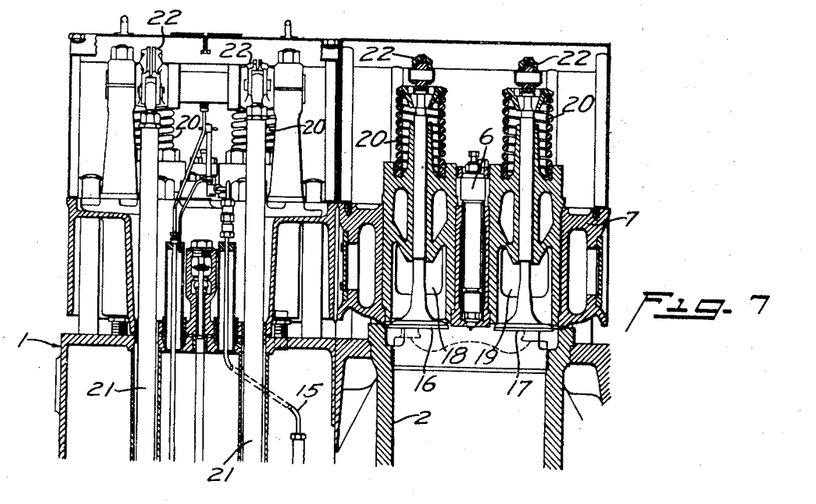
Figure 7 is a sectional detail view of two engine cylinders which illustrate intake and exhaust valves and means for operating the same, although the engine may embody one cylinder or more than the number shown.

Each cylinder 2 is provided with an intake valve 16 and an exhaust valve 17. The intake valves 16 control the admission of gas and air from intake ports 18 into the combustion chambers 8, while the exhaust valves 17 control the exhaust of burnt products of combustion from the combustion chamber 8 into the exhaust ports 19. Both the intake valves 16 and the exhaust valves 17 are yieldingly biased to closed positions by valve springs 20, the valves being opened by reciprocation of the usual push rods 21 and valve levers 22.

Referring to Figure 6, intake and exhaust manifolds 23 and 24, respectively, are arranged horizontally along one side of the engine. Elbows 24' place the intake manifold 23 in communication with the intake ports 18, while elbows 25 place the exhaust manifold 24 in communication with the exhaust ports 19.

Figure 3:
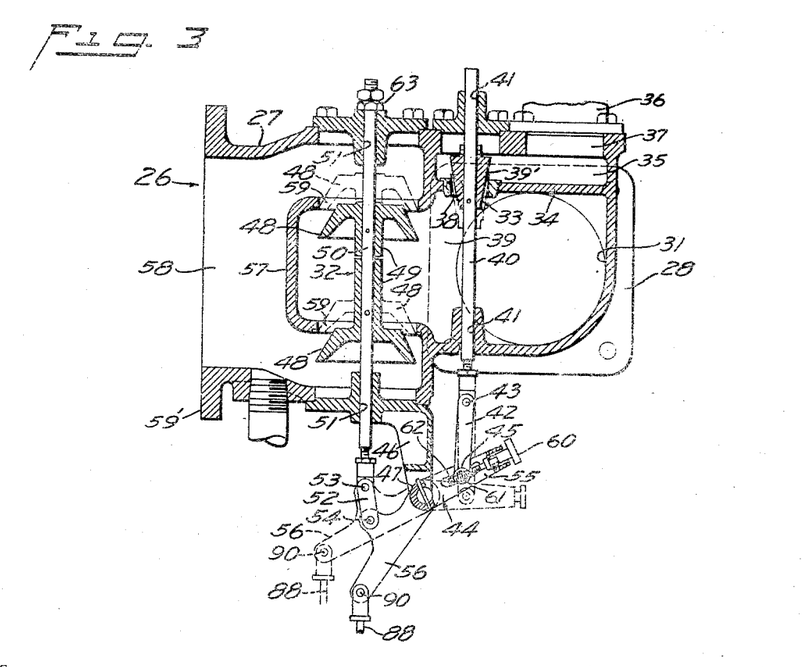
Figure 3 is a sectional view of an air and gas mixing valve.

To one end of the intake manifold 23 is connected a gas and air mixing valve 26. In Figure 3, the valve 26 comprises a housing 27 which is provided with a flange 28 bolted at 29 to the intake manifold flange 30. An opening 31 places the interior of the housing 27 in communication with the intake manifold 23. An air valve 32 and a gas valve 33 are mounted inside the housing 27. The housing is provided with a wall structure 34 which coacts with the housing to provide a gas chamber 35, the latter communicating with a gas inlet pipe 36 through the medium of a passage 37. A gas passage 38 places the chamber 35 in communication with a gas and air mixing chamber 39, the latter communicating with the passage 31. Communication between the chamber 35 and the passage 39 is controlled by a tapered valve element 39' of the gas valve 33. The valve element 39' is fixedly connected with a valve stem 40 slidably guided in bores 41 in the housing 27, and at least one end of the stem 40 extends to a position exteriorally of the housing 27 for connection with a gas valve link 42. This link is pivotally connected at one end with the valve stem 40, as at 43, and at its other end with a gas and air valve lever 44, as at 45. A bracket 46 is attached to the housing 27, and the lever 44 is pivotally connected intermediate its ends at 47 with the bracket 46.

The air valve 32 includes two tapered elements 48, these elements being fixedly related one to the other in co-axial relationship through the medium of sleeves 49, the sleeves being fixedly mounted on a valve stem 50. The valve stems 40 and 50 are arranged in parallel relationship one with the other and the stem 50 is slidably guided in bores 51 in the structure of the housing 27. One end of the stem 50 extends to a position exteriorally of the housing 27, and this end of the stem is pivotally connected with one end of an air valve link 52, as at 53, and the other end of the link 52 is pivotally connected at 54 with the gas and air valve lever 44. It will thus be seen that the valve stem 40 is operatively connected with the arm 55 of the lever 44 and that the stem 50 is operatively connected with the arm 56 of the lever 44.

The housing 27 includes a wall 57 which isolates the air and gas mixing passage 39 from the air inlet passage 58 in the housing. Figure 3 illustrates the air valve 32 and the gas valve 33 in their fully opened positions in full lines, while the dotted line illustrations show the same valves in their fully closed positions. The element 39' is of reversed taper with respect to the tapered contour of the elements 48, and the elements 48 are arranged to open and close ports 59 in the wall 57 to place the air inlet passage 58 in communication with the air and gas mixing passage 39.

An air inlet pipe (not shown) may be connected with a flange 59' on the housing 27. The purpose of the air and gas mixing valve 26 is to provide a proper mixture of air and gas, such as is necessary for good combustion. The air and gas valves are adjustable in relation to each other so that the proper mixture may be obtained for the particular gas being used. Because of the pivotal connections between the valves 32 and 33, pivotal movement of the air and gas valve lever 44 imparts simultaneous movement to the valves 32 and 33, but in opposite directions. The link 42 is connected with a conventional gas valve adjusting screw 60, which screw is threaded through a shaft-like element 61 which is constrained within a quadrant slot 62 in the arm 55, so that the axis of the pivotal connection between the link 42 and the arm 55 may be adjusted in accordance with specific requirements. Such adjusting devices are old and well known in the art.

A stop nut 63 is threaded on the stem 50 to limit the opening movement of the valve 32 beyond the full line of position of Figure 3. With the valves 32 and 33 opened, air is permitted to flow into the mixing passage 39 to co-mingle with the gas admitted thereto through the port 38, this mixture then flowing through the passage 31 and into the intake manifold 23. A gas stop valve 64 is provided in the gas inlet pipe 36. The structure so far described is old and well known in the art.

Figure 1:
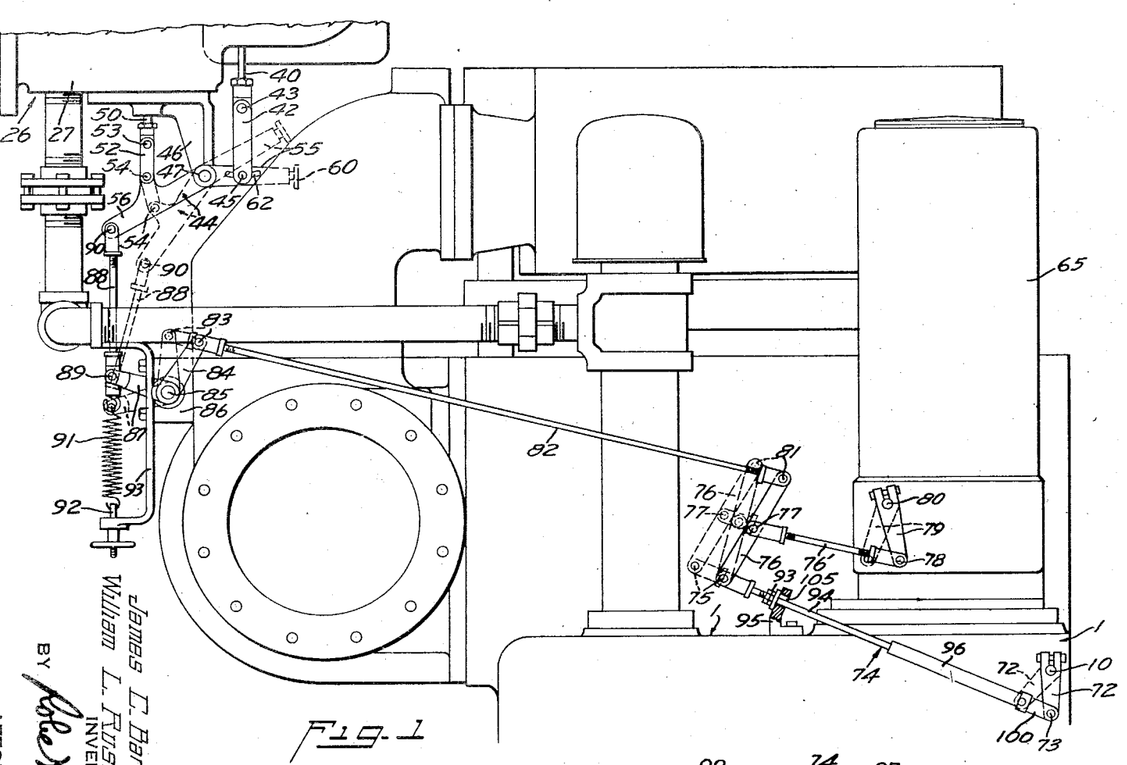
Figure 1 is an elevation view of a portion of one end of an internal combustion engine showing the invention applied thereto.

Referring to Figure 1, a governor 65 is mounted on the frame 1, which governor may be of any approved type, such as an I. C. Woodward governor of the hydraulic type, the latter being well known in the trade. Suffice it to say that the governor is engine driven, as through the medium of the governor shaft 66 (see Figure 5), this shaft being provided with a worm 67 which is driven by a worm gear 68. The worm gear 68 is fixedly related to a gear 69 which meshes with a drive gear 70, the latter being attached to the cam shaft 71 of the engine.

A lever 72 is fixed to the fuel pump control shaft 10, see Figure 1, which lever is pivotally connected at 73 with one end of a fuel pump control link 74, the other end of this link being pivotally connected at 75 with one end of a floating lever 76. A link 76' is pivotally connected at 77 with the floating lever 76 intermediate the ends of the latter, and the link 76' is also pivotally connected at 78 with a lever 79 attached to the power take off shaft 80 of the governor 65.

To the second end of the floating lever 76 is pivotally connected at 81 a link 82 which has its other end pivotally connected at 83 with a lever 84. The lever 84 is fixed to a shaft 85 rotatably supported in a bearing 86, and a second lever 87 is also fixed to the shaft 85, so that the levers 84 and 87 and the shaft 85 function in the manner of a bell crank. To the lever 87 is connected one end of a link 88, as at 89, the other end of the link 88 being pivotally connected at 90 with the outer end of the arm 56 of the gas and air valve lever 44. A tension spring 91 is connected at one end with the link 88 and at its other end with an adjusting screw 92 supported by a bracket 93. This bracket may be mounted on the bearing 86 or any other suitable location on the engine.

In Figure 1, the full line illustration of the linkage system connected with the levers 72 and 79 and the gas and air valve lever 44 represents the fully closed positions of the air and gas valves 32 and 33, respectively, and the pilot injection position of the fuel pump control shaft 10.

With the fuel pump control link 74 in the position of Figure 1, the link 74 is restrained from further movement to impart counterclockwise rotation to the lever 72 by reason of a stop 93 which is adjustably mounted on the section 94 of the link 74. A fixed stop 95 is attached to the frame 1 and is arranged in the path of the stop 93 to be engaged by the latter when the link 74 has moved sufficiently far to bring the pump control rods to their pilot injection metering positions.

Figure 2:
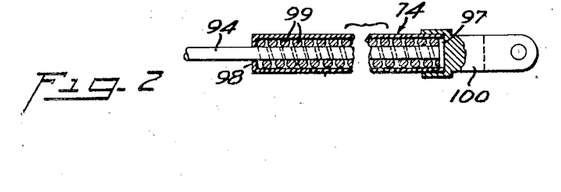
Figure 2 is a fragmentary sectional view of a governor connection link.

The link 74 includes a second section 96 in the nature of a tube, with the section 94 extending into the section 96 and provided with a flange 97 at its inner end. The section 96 is provided with a flange 98 which closely embraces the section 94, and a compression spring 99 is mounted inside the section 96 for end engagement with the flanges 97 and 98. Figure 2 illustrates the flange 97 as lying in engagement with a connecting element 100 attached to the section 96, so that the sections 94 and 96 are yieldably held in the relative positions shown. However, the arrangement is such that the link 74 is restrained from shortening, but the link may be extended when a sufficient pull is exerted thereon.

In Figure 4, a hand control lever 101 is connected with the usual coupling member 102, the latter being operatively connected with a companion coupling 103 to the end that the control rods 12 may be adjusted to shut off positions regardless of the governor. Adjustment of the control rods 12 to their shut off positions with the stop 93 engaging the fixed stop 95 is permitted through compression of the spring 99 and extension of the link 96. The coupling members 102 and 103 are, of course, of such construction as to permit free normal operation of the fuel pump control shaft 10 when the latter is influenced by the action of the governor 65.

In starting the engine, oil fuel is supplied to the fuel pumps 9 through the usual oil supply header 104, and the engine is rotated in the conventional manner, as by compressed air or other suitable starting means. The hand control lever 101 is also adjusted to release the fuel pump control rods 12. The governor 65, owing to the fact that the engine speed is below its normal operating speed, is in the wide open position, which holds the valve 32 and 33, together with fuel pump control rods 12, in wide open positions. At this time the gas stop valve 64 is closed, so that no gas fuel passes to the engine, although a full charge of air is permitted to pass through the mixing valve 26. Since the fuel pump control rods 12 are in their fully opened positions, the fuel pumps 9 deliver oil fuel through the fuel pipes 15 to the injection nozzles 6 and into the combustion chambers 8. Such injection occurs as the pistons 3 approach the ends of their compression strokes for causing ignition and combustion of the mixture of air and fuel in the combustion chambers in the usual manner common in Diesel engines.

As the engine gains in speed, the governor 65 moves the lever 79 in a counterclockwise direction, as when viewing Figure 1, which exerts a pull on the link 76' and pivots the floating lever 76 in a counterclockwise direction about the pivot 81 as an axis, since the tension of the spring 91 is sufficient to restrain the shaft 85 from rotation under the foregoing conditions. Counterclockwise rotation of the floating lever 76 imparts movement to the fuel pump control link 96 for pivoting the fuel pump control shaft 10 in a counterclockwise direction, thereby reducing the amount of oil fuel until it is sufficient to carry the load on the engine. This operation is the same as a conventional type of solid fuel injection Diesel engine, increasing or decreasing the oil fuel injection to correspond with the load effective on the engine.

To operate on gas fuel, the gas stop valve 64 is opened and gas begins to flow through the gas inlet pipe 36. Since the valve 33 is opened, the gas flows through the port 38 and into the air stream to be mixed therewith for delivery to the combustion chambers through the passage 31 and the intake manifold 23. The mixture of gas and air entering the combustion chambers is compressed and ignited by the fuel oil being injected therein through the nozzles 6.

Due to the increase in fuel delivered to the engine, the engine speed is increased with the result that further counterclockwise movement of the governor lever 79 will exert additional pull on the link 76 to reduce the amount of oil fuel delivered to the engine. As this action takes place, the floating lever 76 is further pivoted in a counterclockwise direction to reduce the amount of oil fuel supplied by the fuel pumps 9, which fuel reducing action continues until the stop 93 is brought into engagement with the stop 95. With the stop 93 engaging the fixed stop 95, further counterclockwise rotation of the governor lever 79 imparts clockwise movement to the floating lever 76 about the pivot 75 as an axis, which pivotal movement exerts a pull on the link 82 and causes pivotal movement of the levers 84 and 87 in clockwise directions for lifting the link 88 against the tension of the spring 91. Such upward movement of the link 88 imparts clockwise rotation to the gas and air valve lever 44, thereby closing the valves 32 and 33 in such amounts as to permit the proper amount of gas and air to pass to the engine to carry the load effective thereon.

At this time, the valves 32 and 33 are governor controlled to increase or decrease the gas and air fuel mixture in accordance with engine demands and in the manner common to gas engines. As long as sufficient gas fuel is available through the stop valve 64, the engine will continue its operation as a gas engine, with only sufficient fuel oil passing from the nozzles 6 to maintain continuous and regular ignition. The quantity of pilot injection may be varied to fit specific requirements through adjustment of the stop 93.

If the gas supply available is not sufficient to carry the load on the engine, the governor will move the floating lever in a counterclockwise rotation about the pivot 75 as an axis until the air and gas mixing valve 26 is fully opened, with the stop 63 at rest on the housing 27, after which the governor action imparts clockwise rotation to the floating lever 76 for increasing the amount of oil fuel delivered through the nozzles 6. The amount of fuel oil delivered to the engine will be increased in such an amount that the combined gas and oil fuel is sufficient to carry the load on the engine. In the event that the gas fuel supply is cut off entirely, the governor will continue to move the floating lever 76 for adjusting the control rods 12 to adjust the oil fuel supplied to the engine load demands, with the engine then operating as a direct injection Diesel engine.

It will thus be seen that in case it is desirable to control the amount of gas fuel being used by the engine, such amount can be regulated through manual adjustment of the stop valve 64, with the governor acting upon the control rods 12 to supplement deficiencies in the supply of gas fuel. It will also be seen that when the engine is operating on gas fuel, if the gas supply should diminish or fail the governor will operate to increase the oil fuel accordingly. Thus, the engine operation may continue in a normal manner without interruption or material change in speed, with the governor action automatically controlling the amount of oil fuel delivered to the engine to supplement deficiencies in the gas fuel supply under all operating conditions.

While a single gas and air mixing valve 26 is illustrated, it is obvious that individual gas and air valves may be provided for the respective cylinders. Furthermore, the air valve 32 may be eliminated, thereby permitting unrestricted flow of air at all times and the governor control only operating on gas fuel. It is also obvious that electric ignition may be substituted for pilot oil ignition, in which case the stop 93 would be eliminated so that the fuel pump delivery would be entirely shut off if the engine were operated as a gas engine. Separate pumps and nozzles could be employed for pilot ignition instead of the main pumps for this purpose. In this case, as in the case of electric ignition, the stop 93 would be eliminated and the pilot fuel pumps adjusted for the minimum amount of fuel required when operating as a gas engine to provide continuous and regular ignition.

Figure 1 illustrates an opening 105 in the fixed stop 95, which opening is of sufficient size to provide unrestricted movement of the fuel pump control link 74. The fixed stop 95 also performs an additional function as a support which prevents dropping of the links 74, 76', 82, and the floating lever 76.

Figure 8:
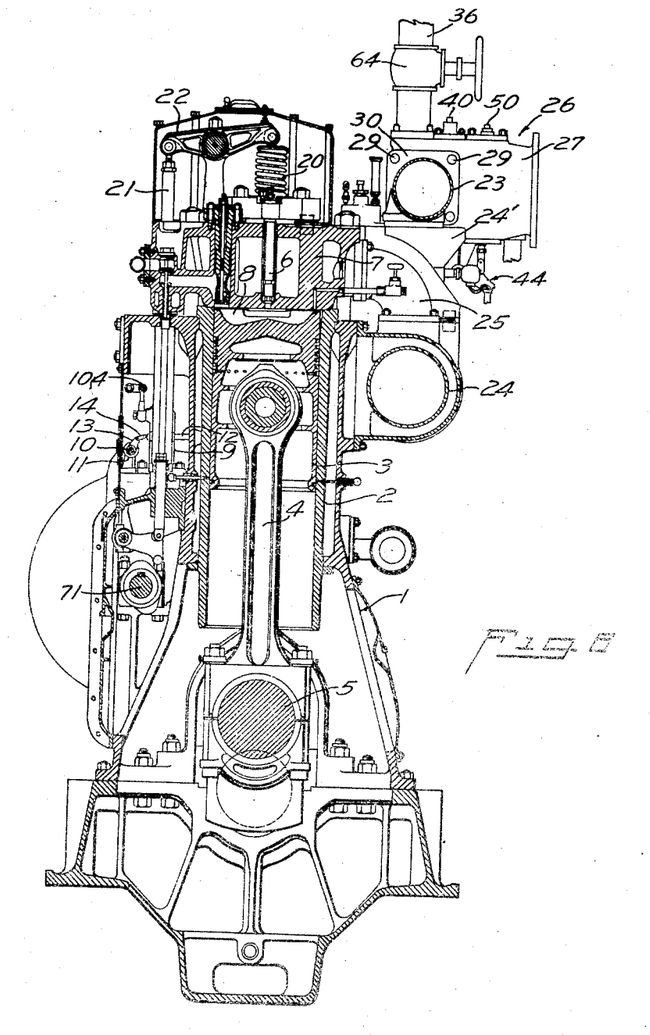
Figure 8 is a sectional detail view illustrating a fuel pump drive.

Figure 8 illustrates the cam shaft 71 as being provided with cams 106 and 107 for operating the push rods 21 and the fuel pump push rods 108, respectively.

In lieu of the spring 91 in Figure 1, a weight may be employed for loading the link 88, which would operate in the same manner as the spring.

It will be understood that the invention is not to be limited to the specific construction or arrangement of parts shown, but that they may be widely modified within the invention defined by the claims.

What is claimed is:

1. In a dual fuel engine of the internal combustion type, the combination of means for automatically controlling the delivery of a gas fuel and air to the engine in accordance with engine load demands, an engine driven governor, means controlled by said governor for automatically delivering oil fuel to the engine in amounts sufficient to supplement deficiencies in available gas fuel, and means for admitting air to said engine, said last-mentioned means being so constructed and arranged as to provide a full charge of air for the engine upon partial or total deficiency in the gas fuel supply.

2. In a dual fuel engine of the internal combustion type, the combination of means for automatically controlling the delivery of a gas fuel to the engine in accordance with engine load demands, an engine driven governor, means controlled by said governor for automatically delivering oil fuel to the engine in amounts sufficient to supplement deficiencies in available gas fuel, means controlled by said governor for delivering a pilot injection of oil fuel to the engine regardless of the amount of gas fuel delivered to the engine, air admitting means for said engine, said air admitting means and said oil fuel delivering means being so constructed and arranged as to provide a charge of oil fuel for the engine only after a full charge of air for the engine is available.

3. In a dual fuel engine of the internal combustion type, the combination of a cylinder having a combustion chamber, a fuel injection nozzle communicating with said combustion chamber, an engine driven fuel pump for delivering oil fuel to said combustion chamber, a gas fuel valve for controlling the admittance of a gas fuel to said combustion chamber, an intake valve for admitting gas fuel to the combustion chamber, an engine driven governor, an operating connection between said governor and said gas fuel valve for regulating the delivery of gas fuel to the combustion chamber in accordance with engine load demands, an operating connection between said governor and said fuel pump for regulating the delivery of oil fuel to the engine in amounts sufficient to supplement deficiencies in available gas fuel, and means for admitting air to the combustion chamber through said intake valve, said air admitting means and said fuel pump and governor connecting means being so constructed and arranged as to provide a charge of fuel oil for the combustion chamber only after a full charge of air is available for the chamber.

4. In a dual fuel engine of the internal combustion type, the combination of a cylinder having a combustion chamber, a fuel injection nozzle communicating with said combustion chamber, an engine driven fuel pump for delivering oil fuel to said combustion chamber, a gas fuel valve for controlling the admittance of a gas fuel to said combustion chamber, an intake valve for admitting gas fuel to the combustion chamber, an engine driven governor, an operating connection between said governor and said gas fuel valve for regulating the delivery of gas fuel to the combustion chamber in accordance with engine load demands, an operating connection between said governor and said fuel pump for regulating the delivery of oil fuel to the engine in amounts sufficient to supplement deficiencies in available gas fuel, means for admitting air to the combustion chamber through said intake valve, said air admitting means and said fuel pump and governor connection being so constructed and arranged as to provide a charge of fuel oil for the combustion chamber only after a full charge of air is available for the chamber, and means including in part said governor for controlling said fuel pump to deliver a pilot injection of oil fuel to said nozzle regardless of the amount of fuel gas delivered to the combustion chamber.

5. In a dual fuel engine of the internal combustion type, the combination of a cylinder having a combustion chamber, a fuel injection nozzle communicating with said combustion chamber, an engine driven fuel pump for delivering oil fuel to said combustion chamber, a gas fuel valve for controlling the admittance of a gas fuel to said combustion chamber, an intake valve for admitting gas fuel to the combustion chamber, an engine driven governor, an operating connection between said governor and said gas fuel valve for regulating the delivery of gas fuel to the combustion chamber in accordance with engine load demands, an operating connection between said governor and said fuel pump for regulating the delivery of oil fuel to the engine in amounts sufficient to supplement deficiencies in available gas fuel, means for admitting air to the combustion chamber through said intake valve, said air admitting means and said fuel pump and governor connection being so constructed and arranged as to provide a charge of fuel oil for the combustion chamber only after a full charge of air is available for the chamber, means including in part said governor for controlling said fuel pump to deliver a pilot injection of oil fuel to said nozzle regardless of the amount of fuel gas delivered to the combustion chamber, and a manually controlled means for adjusting said fuel pump to a shut-off position regardless of the operating condition of said last-mentioned operating connection.

6. In a dual fuel engine of the internal combustion type, the combination of a cylinder having a combustion chamber, a fuel injection nozzle communicating with said combustion chamber, an engine driven fuel pump for delivering oil fuel to said combustion chamber, a gas fuel valve for controling the admittance of a gas fuel to said combustion chamber, an intake valve for admitting gas fuel to the combustion chamber, an engine driven governor, an operating connection between said governor and said gas fuel valve for regulating the delivery of gas fuel to the combustion chamber in accordance with engine load demands, an operating connection between said governor and said fuel pump for regulating the delivery of oil fuel to the engine in amounts sufficient to supplement deficiencies in available gas fuel, means for admitting air to the combustion chamber through said intake valve, said air admitting means and said fuel pump and governor connection being so constructed and arranged as to provide a charge of fuel oil for the combustion chamber only after a full charge of air is available for the chamber, and means for regulating the amount of gas fuel delivered to the combustion chamber independently of said governor.

7. In a dual fuel engine of the internal combustion type, the combination of a cylinder having a combustion chamber, a fuel injection nozzle communicating with said combustion chamber, an engine driven fuel pump for delivering oil fuel to said nozzle, an air and fuel gas mixing valve means communicating with said combustion chamber, an intake valve for controlling the admission of air and gas fuel to the combustion chamber, an engine driven governor, an operating connection between said governor and said valve means to actuate the latter for regulating the delivery of relative quantities of air and fuel gas to the combustion chamber in accordance with engine load demands, said valve means being so constructed and arranged as to admit a full charge of air to the combustion chamber upon partial or total deficiency in the gas fuel supply, an operating conection between said governor and said fuel pump for regulating the delivery of oil fuel to the engine in amounts sufficient to supplement deficiencies in available gas fuel, means including in part said governor for controlling said fuel pump to deliver a pilot injection of oil fuel to said nozzle regardless of the amount of gas fuel delivered to the combustion chamber, and means for regulating the amount of gas fuel delivered to the combustion chamber independently of said governor.

8. In a dual fuel engine of the internal combustion type, the combination of a cylinder having a combustion chamber, a fuel injection nozzle communicating with said combustion chamber, an engine driven fuel pump for delivering oil fuel to said nozzle, a gas admitting valve communicating with said combustion chamber, an intake valve for admitting gas fuel to the combustion chamber, an engine driven governor, an operating connection between said governor and said gas admitting valve for regulating the delivery of gas fuel to the combustion chamber in accordance with engine load demands, an operating connection between said governor and said fuel pump for regulating the delivery of oil fuel to the engine in amounts sufficient to supplement deficiencies in available gas fuel, means including in part said governor for controlling said fuel pump to deliver a pilot injection of oil fuel to said nozzle regardless of the amount of gas fuel delivered to the combustion chamber, a manually controlled means for adjusting said fuel pump to a shut off position regardless of the operating condition of said last-mentioned operating connection, means for regulating the amount of gas fuel delivered to the combustion chamber independently of the governor, and means for admitting air to said combustion chamber through the intake valve, said air admitting means and said operating connection between the fuel valve and governor being so constructed and arranged as to provide a charge of fuel oil for the combustion chamber only after a full charge of air is available for the engine.

9. In a dual fuel engine of the internal combustion type, the combination of cylinders each having a combustion chamber, a fuel injection nozzle for each combustion chamber, engine driven fuel pumps each delivering oil fuel to one injection nozzle, gas fuel valve means communicating with said combustion chambers, intake valves for admitting the gas fuel to the respective combustion chambers, an engine driven governor, means biasing said gas fuel valve means to an open position, a floating lever actuated by said governor, an operating connection between said floating lever and said gas fuel valve means, an operating connection between said floating lever and said fuel pumps for regulating the delivery of oil fuel to the respective nozzles in amounts sufficient to supplement deficiencies in available gas fuel, and means for admitting air to said combustion chambers, said air admitting means and said operating connection between said lever and fuel pumps being so constructed and arranged as to cause a charge of oil fuel to be delivered to the combustion chambers only after a full charge of air is available for the engine.

10. In a dual fuel engine of the internal combustion type, the combination of cylinders each having a combustion chamber, a fuel injection nozzle for each combustion chamber, engine driven fuel pumps each delivering oil fuel to one injection nozzle, gas fuel valve means communicating with said combustion chambers, intake valves for admitting the gas fuel to the respective combustion chambers, an engine driven governor, means biasing said gas fuel valve means to an open position, a floating lever actuated by said governor, an operating connection between said floating lever and said gas fuel valve means, an operating connection between said floating lever and said fuel pumps for regulating the delivery of oil fuel to the respective nozzles in amounts sufficient to supplement deficiencies in available gas fuel, means for admitting air to said combustion chambers, said air admitting means and said operating connection between said lever and said fuel pumps being so constructed and arranged as to cause a charge of oil fuel to be delivered to the combustion chambers only after a full charge of air is available for the chambers, said fuel pumps including control rods, means for adjusting said control rods to shut-off positions independently of said governor, and means interposed in said second-mentioned operating connection for yieldingly connecting said control rods with said governor.

11. In a dual fuel engine of the internal combustion type, the combination of cylinders each having a combustion chamber, a fuel injection nozzle for each combustion chamber, engine driven fuel pumps each delivering oil fuel to one injection nozzle, gas fuel valve means communicating with said combustion chambers, intake valves for admitting gas fuel to the respective combustion chambers, an engine driven governor, means biasing said gas fuel valve means to an open position, a floating lever actuated by said governor, an operating connection between said floating lever and said fuel pumps for regulating the delivery of oil fuel to the respective nozzles in amounts sufficient to supplement deficiencies in available gas fuel, said fuel pumps including control rods operatively connected with said second-mentioned operating connection, means for arresting movement of said control rods upon application of the latter to shut off positions to cause pilot injection of oil fuel regardless of the amount of gas fuel delivered to the combustion chambers, means for admitting air to said combustion chambers through the intake valves, said air admitting means and said operating connection between said lever and fuel pumps being so constructed and arranged as to cause a charge of fuel oil to be delivered to the combustion chambers only after a full charge of air is available for the combustion chambers.

12. In a dual fuel engine of the internal combustion type, the combination of cylinders each having a combustion chamber, a fuel injection nozzle for each combustion chamber, engine driven fuel pumps each delivering oil fuel to one injection nozzle, gas fuel valve means communicating with said combustion chambers, intake valves for admitting gas fuel to the respective combustion chambers, an engine driven governor, means biasing said gas fuel valve means to an open position, a floating lever actuated by said governor, an operating connection between said floating lever and said fuel pumps for regulating the delivery of oil fuel to the respective nozzles in amounts sufficient to supplement deficiencies in available gas fuel, said fuel pumps including control rods operatively connected with said second-mentioned operating connection, means for arresting movement of said control rods upon application of the latter to shut-off positions to cause pilot injection of oil fuel regardless of the amount of gas fuel delivered to the combustion chambers, means for admitting air to said combustion chambers through the intake valves, said air admitting means and said operating connection between said lever and said fuel pumps being so constructed and arranged as to cause a charge of fuel oil to be delivered to the combustion chambers only when a full charge of air is available for the combustion chambers, and manually controlled means for shifting said control rods to shut-off positions.

13. In a dual fuel engine of the internal combustion type, the combination of a cylinder having a combustion chamber, a fuel injection nozzle communicating with said combustion chamber, an engine driven fuel pump for delivering oil fuel to said nozzle, air and gas fuel mixing valve means communicating with said combustion chamber, an intake valve for admitting air and gas fuel to the combustion chamber, an engine driven governor, a floating lever operatively connected with said governor, an operating connection between said floating lever and said valve means for regulating the delivery of air and gas fuel to the combustion chamber in accordance with engine load demands, said valve means being so constructed and arranged as to cause a full charge of air to be admitted to said combustion chamber coincident with partial or total deficiency in the gas fuel, and an operating connection between said floating lever and said fuel pump for regulating the delivery of oil fuel to the engine in such amounts to supplement deficiencies in available gas fuel.

14. In a dual fuel engine of the internal combustion type, the combination of a cylinder having a combustion chamber, a fuel injection nozzle communicating with said combustion chamber, an engine driven fuel pump for delivering oil fuel to said nozzle, air and gas fuel mixing valve means communicating with said combustion chamber, an intake valve for admitting air and gas fuel to the combustion chamber, an engine driven governor, a floating lever operatively connected with said governor, an operating connection between said floating lever and said valve means for regulating the delivery of air and gas fuel to the combustion chamber in accordance with engine load demands, said valve means being so constructed and arranged as to cause a full charge of air to be admitted to said combustion chamber coincident with partial or total deficiency in the gas fuel, an operating connection between said floating lever and said fuel pump for regulating the delivery of oil fuel to the engine in such amounts to supplement deficiencies in available gas fuel, said fuel pump including a control rod, and means for arresting movement of said control rod when adjusted toward a shut-off position to provide pilot injection of oil fuel regardless of the amount of gas fuel delivered to the combustion chamber.

15. In a dual fuel engine of the internal combustion type, the combination of a cylinder having a combustion chamber, a fuel injection nozzle communicating with said combustion chamber, an engine driven fuel pump for delivering oil fuel to said nozzle, a gas fuel valve means for admitting gas fuel to the combustion chamber, an intake valve for admitting gas fuel to the combustion chamber, an engine driven governor, a floating lever operatively connected with said governor, an operating connection between said floating lever and said gas fuel valve means for regulating the delivery of gas fuel to the combustion chamber in accordance with engine load demands, air admitting means for said combustion chamber, said air admitting means being so constructed and arranged as to provide a full charge of air for the combustion chamber coincident with partial or total deficiency in the gas fuel, an operating connection between said floating lever and said fuel pump for regulating the delivery of oil fuel to the engine in such amounts as to supplement deficiencies in available gas fuel and allow delivery of oil fuel to the engine only when a full charge of air for the engine is available, and means for arresting adjustment of said second-mentioned operating connection when said fuel pump is adjusted toward a shut-off position to provide pilot injection of oil fuel regardless of the amount of gas fuel delivered to the combustion chamber.

16. In a dual fuel engine of the internal combustion type, the combination of a cylinder having a combustion chamber, a fuel injection nozzle communicating with said combustion chamber, an engine driven fuel pump for delivering oil fuel to said nozzle, a gas fuel valve means for admitting gas fuel to the combustion chamber, an intake valve for admitting gas fuel to the combustion chamber, an engine driven governor, a floating lever operatively connected with said governor, an operating connection between said floating lever and said gas fuel valve means for regulating the delivery of gas fuel to the combustion chamber in accordance with engine load demands, air admitting means for said combustion chamber, said air admitting means being so constructed and arranged as to provide a full charge of air for the combustion chamber coincident with partial or total deficiency in the gas fuel, an operating connection between said floating lever and said fuel pump for regulating the delivery of oil fuel to the engine in such amounts as to supplement deficiencies in available gas fuel and allow delivery of oil fuel to the engine only when a full charge of air for the engine is available, means for arresting adjustment of said second-mentioned operating connection when said fuel pump is adjusted toward a shut-off position to provide pilot injection of oil fuel regardless of the amount of gas fuel delivered to the combustion chamber, yielding means interposed in said second-mentioned operating connection, and manually controlled means for adjusting said fuel pump to a shut-off position through yielding of said yielding means.

17. In a dual fuel engine of the internal combustion type, the combination of a cylinder having a combustion chamber, an engine driven governor, gas fuel admitting means for said combustion chamber operatively connected with said governor for admitting gas fuel in accordance with engine load demands, an oil fuel admitting means operatively connected with said governor and so constructed and arranged as to admit oil fuel to the engine in amounts sufficient to supplement deficiencies in available gas fuel, and an air admitting valve operatively connected with said governor for supplying air to the combustion chamber, said air admitting valve being operatively connected with said governor to provide a full charge of air for the combustion chamber in the fully opened position of said gas fuel admitting means and before the admission of oil fuel to the engine.

18. In a dual fuel engine of the internal combustion type, means for delivering a gas and air fuel mixture to the engine, means for automatically controlling the delivery of gas fuel and air to the engine in accordance with engine load demands, an engine governor, means for delivering oil fuel to the engine, means controlled by said governor for automatically controlling the delivery of oil fuel to the engine in amounts sufficient to supplement deficiencies in available gas fuel, said governor controlled means so constructed and arranged that deficiency supplementing charges of oil fuel are delivered to the engine only after a full charge of air for the engine is available.

JAMES C. BARNABY.
WILLIAM L. RUSSELL.